US012562414B2

(12) United States Patent
Li

(10) Patent No.: US 12,562,414 B2
(45) Date of Patent: Feb. 24, 2026

(54) THERMAL MANAGEMENT SYSTEM FOR ENERGY STORAGE DEVICE AND ENERGY STORAGE DEVICE

(71) Applicant: CONTEMPORARY AMPEREX TECHNOLOGY (HONG KONG) LIMITED, Hong Kong (CN)

(72) Inventor: Qing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 323 days.

(21) Appl. No.: 18/471,312

(22) Filed: Sep. 21, 2023

(65) Prior Publication Data

US 2024/0014467 A1     Jan. 11, 2024

Related U.S. Application Data

(63) Continuation of application No. PCT/CN2022/097088, filed on Jun. 6, 2022.

(30) Foreign Application Priority Data

Nov. 12, 2021   (CN) ......................... 202122771967.8

(51) Int. Cl.
*H01M 10/6568*          (2014.01)
*H01M 10/613*           (2014.01)
                                 (Continued)
(52) U.S. Cl.
CPC ..... *H01M 10/6568* (2015.04); *H01M 10/613* (2015.04); *H01M 10/6563* (2015.04); *H01M 50/244* (2021.01)
(58) Field of Classification Search
CPC ........... H01M 10/6568; H01M 10/613; H01M 10/6563; H01M 50/244; H01M 2220/20;
                                 (Continued)

(56) References Cited

U.S. PATENT DOCUMENTS

2018/0175430 A1* 6/2018 Modderno ........ H01M 8/04686
2021/0136946 A1    5/2021 Welser et al.
                              (Continued)

FOREIGN PATENT DOCUMENTS

CA          2947772 A1 *  5/2018  ......... F28D 20/0034
CN          1538135 A  * 10/2004  ............... F27B 1/24
                              (Continued)

OTHER PUBLICATIONS

International Search Report received in the corresponding International Application PCT/CN2022/097088, mailed Aug. 26, 2022.

*Primary Examiner* — Kaity V Chandler
(74) *Attorney, Agent, or Firm* — K&L Gates LLP

(57)          ABSTRACT

Disclosed is a thermal management system for an energy storage device and an energy storage device. The energy storage device includes a plurality of battery cabinets, battery packs are arranged in the battery cabinets, and the thermal management system includes a water chilling unit and a plurality of sets of first pipeline assemblies. The plurality of sets of first pipeline assemblies correspond to the plurality of battery cabinets one to one, and are connected to the water chilling unit in parallel. Each of the first pipeline assemblies includes two battery cabinet pipelines, one end of the two battery cabinet pipelines is connected to a water inlet side and a water outlet side of the water chilling unit respectively, and the other ends of the two battery cabinet pipelines penetrate into the corresponding battery cabinets respectively and are connected to water chilling plates of the battery packs in the battery cabinets.

8 Claims, 7 Drawing Sheets

(51) Int. Cl.
    *H01M 10/6563*     (2014.01)
    *H01M 50/244*     (2021.01)

(58) Field of Classification Search
    CPC ............. H01M 10/625; H01M 10/627; H01M 10/6556; H01M 10/6567; H01M 50/204; Y02E 60/10
    See application file for complete search history.

(56)           References Cited

U.S. PATENT DOCUMENTS

| | | | |
|---|---|---|---|
| 2022/0089237 A1* | 3/2022 | Sverdlov | B25J 9/1697 |
| 2022/0294052 A1* | 9/2022 | Kwon | A62C 2/06 |
| 2022/0311257 A1* | 9/2022 | Lai | H01M 50/204 |
| 2024/0092189 A1* | 3/2024 | Bower | B60L 50/64 |

FOREIGN PATENT DOCUMENTS

| | | | | | |
|---|---|---|---|---|---|
| CN | 105699413 | A | * | 6/2016 | G01N 25/02 |
| CN | 207624868 | U | | 7/2018 | |
| CN | 109478699 | A | * | 3/2019 | H01M 10/613 |
| CN | 110849162 | A | * | 2/2020 | F23J 15/06 |
| CN | 210750990 | U | * | 6/2020 | A62C 3/16 |
| CN | 211551916 | U | | 9/2020 | |
| CN | 111834701 | A | * | 10/2020 | H01M 10/4285 |
| CN | 211654893 | U | | 10/2020 | |
| CN | 211789134 | U | | 10/2020 | |
| CN | 213026257 | U | | 4/2021 | |
| CN | 112968239 | A | | 6/2021 | |
| CN | 213401319 | U | | 6/2021 | |
| CN | 114256533 | A | * | 3/2022 | H01M 10/653 |
| CN | 216120462 | U | | 3/2022 | |
| CN | 216161800 | U | | 4/2022 | |
| CN | 216354424 | U | | 4/2022 | |
| CN | 115411436 | A | * | 11/2022 | H01M 50/358 |
| CN | 116053604 | A | * | 5/2023 | H01M 10/058 |
| CN | 116598648 | A | * | 8/2023 | H01M 10/613 |
| CZ | 35844 | U1 | * | 3/2022 | F25B 30/06 |
| KR | 102020569 | B1 | * | 9/2019 | H01M 10/627 |
| KR | 102220902 | B1 | * | 2/2021 | H01M 10/486 |

* cited by examiner

THERMAL MANAGEMENT SYSTEM FOR ENERGY STORAGE DEVICE AND ENERGY STORAGE DEVICE

CROSS-REFERENCE APPLICATIONS

The present application is a continuation of International Application No. PCT/CN2022/097088, filed on Jun. 6, 2022, which claims priority to Chinese patent application No. 202122771967.8, filed on Nov. 12, 2021 and entitled "THERMAL MANAGEMENT SYSTEM FOR ENERGY STORAGE DEVICE AND ENERGY STORAGE DEVICE", which is incorporated into this application by reference in its entirety.

TECHNICAL FIELD

The present application relates to the technical field of energy storage devices, in particular to a thermal management system for an energy storage device and an energy storage device.

BACKGROUND ART

In order to facilitate the movement and transportation of energy storage devices, a container-type energy storage device has appeared in the related art. A plurality of battery cabinets are arranged in the container-type energy storage device, and a battery pack for storing energy is arranged in each battery cabinet. The battery packs will generate a lot of heat during charging and discharging. In order to cool down these battery packs, the container-type energy storage device is equipped with a corresponding heat dissipation device.

A traditional heat dissipation device includes a main pipeline and a plurality of branch pipelines connected to the main pipeline. In order to optimize the pipeline layout, it is usually necessary to arrange an even number of branch pipelines, which leads to great limitations in the application of the heat dissipation device.

SUMMARY OF THE INVENTION

Based on this, it is necessary to provide a thermal management system for an energy storage device and an energy storage device in view of the problem that existing heat dissipation devices have great application limitations.

According to one aspect of the present application, a thermal management system for an energy storage device is provided. The energy storage device includes a plurality of battery cabinets, battery packs are arranged in the battery cabinets, and the thermal management system includes a water chilling unit and a plurality of sets of first pipeline assemblies. The plurality of sets of first pipeline assemblies correspond to the plurality of battery cabinets one to one, and are connected to the water chilling unit in parallel. Each of the first pipeline assemblies includes two battery cabinet pipelines, one end of the two battery cabinet pipelines is connected to a water inlet side and a water outlet side of the water chilling unit respectively, and the other ends of the two battery cabinet pipelines penetrate into the corresponding battery cabinets respectively and are connected to water chilling plates of the battery packs in the battery cabinets.

In the technical solution of the present application, water flowing out from the water outlet side of the water chilling unit can flow into one of the battery cabinet pipelines of the plurality of sets of first pipeline assemblies respectively and then flow into the water chilling plates of the battery packs in the corresponding battery cabinets, the water flowing into the water chilling plates of the battery packs can exchange heat with air in the battery packs, the water after heat exchange then flows into the other battery cabinet pipeline of the corresponding first pipeline assembly, and water in battery cabinet outlet pipes of the plurality of sets of first pipeline assemblies can flow back into the water inlet side of the water chilling unit. In this way, the water chilling unit can be used to perform thermal management on the battery packs in the plurality of battery cabinets, and the plurality of sets of first pipeline assemblies are independent of each other, so that each first pipeline assembly can be independently controlled. Obviously, the thermal management system abandons the design of a main pipeline, the number of the first pipeline assemblies is not limited, and parallel-connection nodes of the plurality of sets of first pipeline assemblies are no longer limited to the main pipeline, which can broaden the application range of the thermal management system.

In one of the embodiments, the ends of the battery cabinet pipelines away from the water chilling unit are configured to penetrate from bottom ends of the corresponding battery cabinets to be connected with the water chilling plates of the battery packs in the battery cabinets. The situation that liquid leaked in the pipelines flows to the battery packs in the battery cabinets due to the pipelines penetrating into the battery cabinets from top ends of the battery cabinets is avoided, and potential safety hazards can be reduced.

In one of the embodiments, the battery cabinet pipeline includes a first pipeline connected to the water chilling plate, a second pipeline connected to the water chilling unit, and a pipe joint connecting the first pipeline and the second pipeline and penetrating through the bottom end of the corresponding battery cabinet. The pipe joint is sleeved with a flange tightly connected to the bottom end of the corresponding battery cabinet. The airtightness of the battery cabinets can be improved without affecting the penetration of the pipe joints through the bottom ends of the corresponding battery cabinets.

In one of the embodiments, a seal ring tightly connected to a bottom inner wall of the corresponding battery cabinet is arranged on one side of the flange facing the bottom end of the corresponding battery cabinet, to make the flange tightly connected to the bottom end of the corresponding battery cabinet. The flanges can be pressed and fixed on the bottom inner walls of the corresponding battery cabinets, not only can the flanges stably mounted, but also the seal rings can be tightly attached on the bottom inner walls of the corresponding battery cabinets, so that the airtightness of the battery cabinets is improved, and it is ensured that the environment in the battery cabinets is not affected by the humidity and temperature of the external atmospheric environment.

In one of the embodiments, the second pipeline further includes a first section connected to the pipe joint and perpendicular to a bottom surface of the battery cabinet and a second section connected to the water chilling unit and parallel to the bottom surface of the battery cabinet. It is not only convenient for the first sections to be connected to the pipe joints penetrating through the bottom ends of the corresponding battery cabinets, but also allows the second sections to be distributed in a direction parallel to the bottom surfaces of the battery cabinets, which is beneficial to saving the occupied space of the first pipeline assemblies.

In one of the embodiments, a drain port is arranged on the first section, a normally closed stop valve is arranged on the drain port, and an on-off valve is arranged between the second section and the water chilling unit. When needed, the on-off valves can be closed and the stop valves can be opened to empty fluid in the battery cabinet pipelines, which is convenient for checking and repairing the battery cabinet pipelines.

In one of the embodiments, a plurality of battery packs are arranged in the battery cabinets, and the first pipeline is provided with a plurality of branch pipes correspondingly connected to the water chilling plates of the plurality of battery packs one to one. Each set of first pipeline assemblies and the water chilling unit form a battery cabinet circulation loop, and fluid in one battery cabinet circulation loop can be supplied to the water chilling plates of the plurality of battery packs in the corresponding battery cabinets to perform thermal management on the plurality of battery packs.

In one of the embodiments, insulation layers are arranged on the battery cabinet pipelines. The heat insulation effect of the battery cabinet pipelines can be improved, thus avoiding the phenomenon of condensation on the battery cabinet pipelines.

In one of the embodiments, the plurality of battery cabinets are divided into two battery cabinet sets arranged at intervals in a first direction, and each battery cabinet set includes a plurality of battery cabinets arranged at intervals in a second direction. The plurality of sets of first pipeline assemblies are distributed at intervals in the first direction. The first direction and the second direction are perpendicular to each other. The pipeline layout of the thermal management system can be made more reasonable, which is more conducive to reducing the occupied space of the first pipeline assemblies.

In one of the embodiments, the energy storage device further includes an electric cabin, and the thermal management system further includes a heat exchanger arranged in the electric cabin, and a second pipeline assembly connected to the heat exchanger and the water chilling unit respectively. The water chilling unit is connected to a heat exchange pipe of the heat exchanger to form an electric cabin circulation pipeline. Fluid in the electric cabin circulation pipeline can exchange heat with air in the environment where the heat exchanger is located, that is, the fluid in the electric cabin circulation pipeline can exchange heat with the air in the electric cabin to adjust the temperature in the electric cabin to an appropriate temperature.

In one of the embodiments, a distribution box is arranged in the electric cabin, the thermal management system includes two heat exchangers arranged on an air inlet and an air outlet of the distribution box respectively, and cooling fans facing the adjacent heat exchangers are arranged on the air inlet and the air outlet. Two sets of heat dissipator assemblies can be used to improve the circulation of air inside and outside the distribution box, improve the heat exchange effect, improve the energy efficiency of the water chilling unit to a certain extent, and reduce the overall operating energy consumption of the battery packs and electric parts in the energy storage device.

According to another aspect of the present application, an energy storage device is provided, including the above thermal management system for the energy storage device.

DESCRIPTION OF DRAWINGS

Various other advantages and benefits will become apparent to those of ordinary skill in the art upon reading the following detailed description of the preferred embodiments. The drawings are for the purpose of illustrating the

Figure 1:
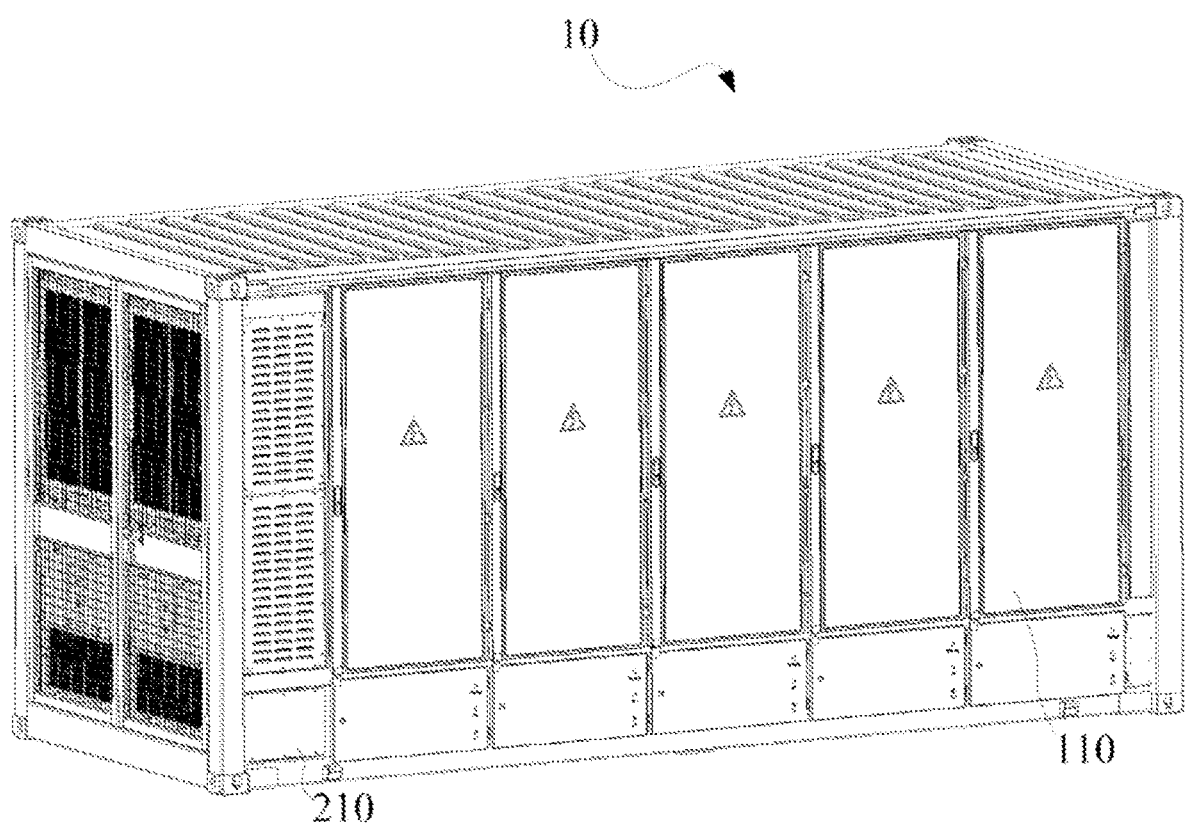
Figure 2:
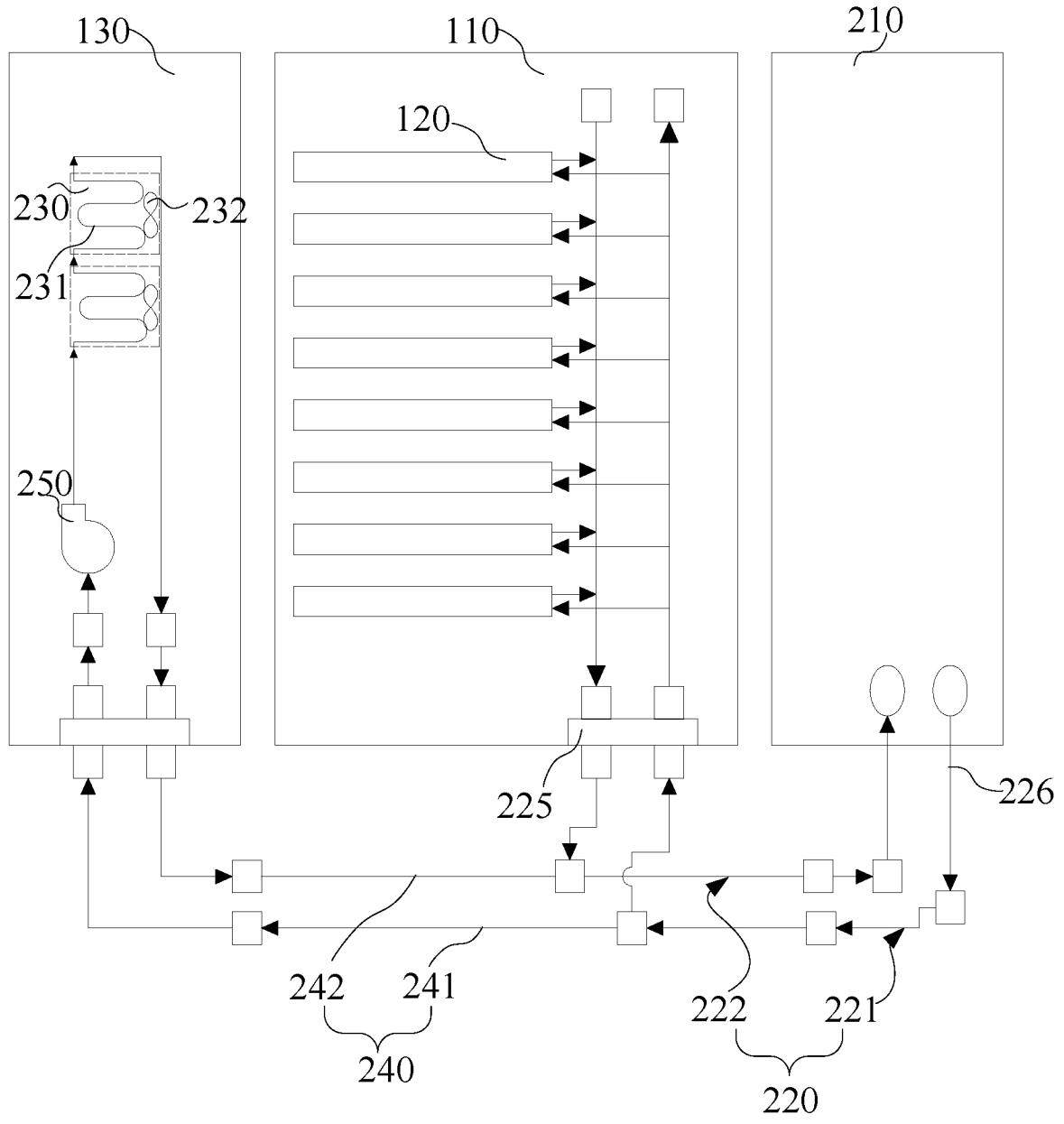
Figure 3:
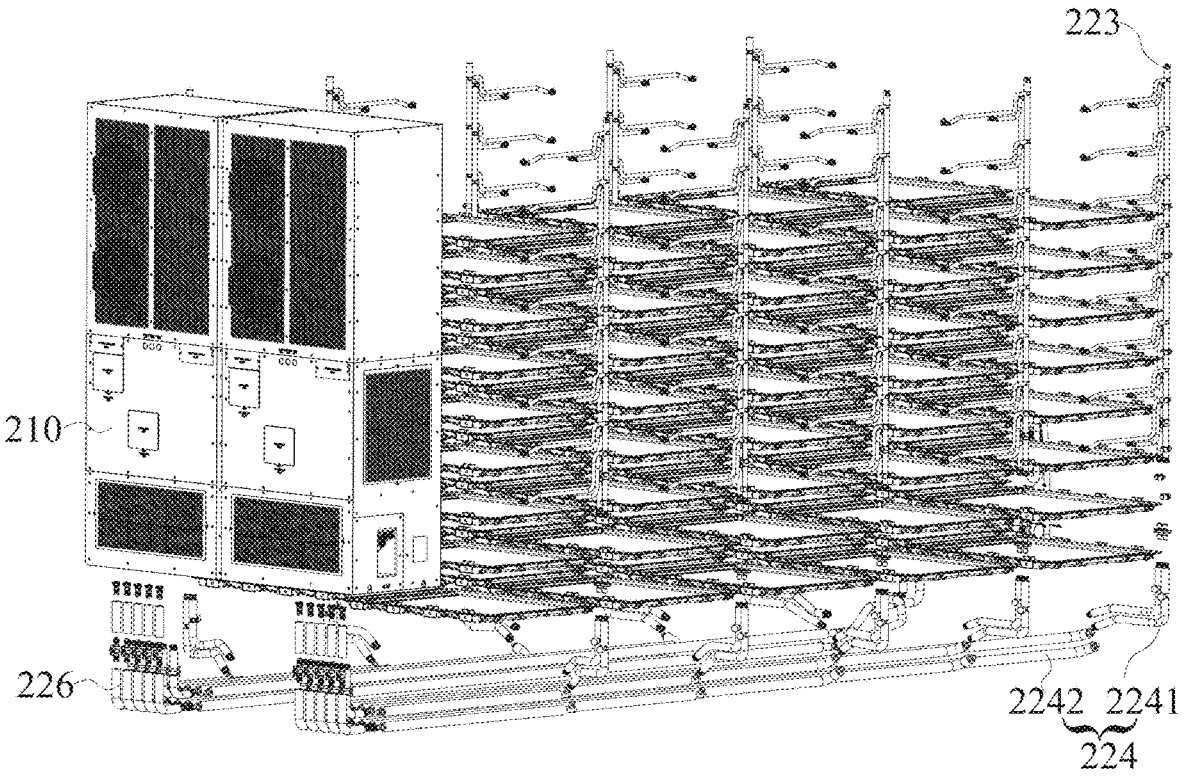
Figure 4:
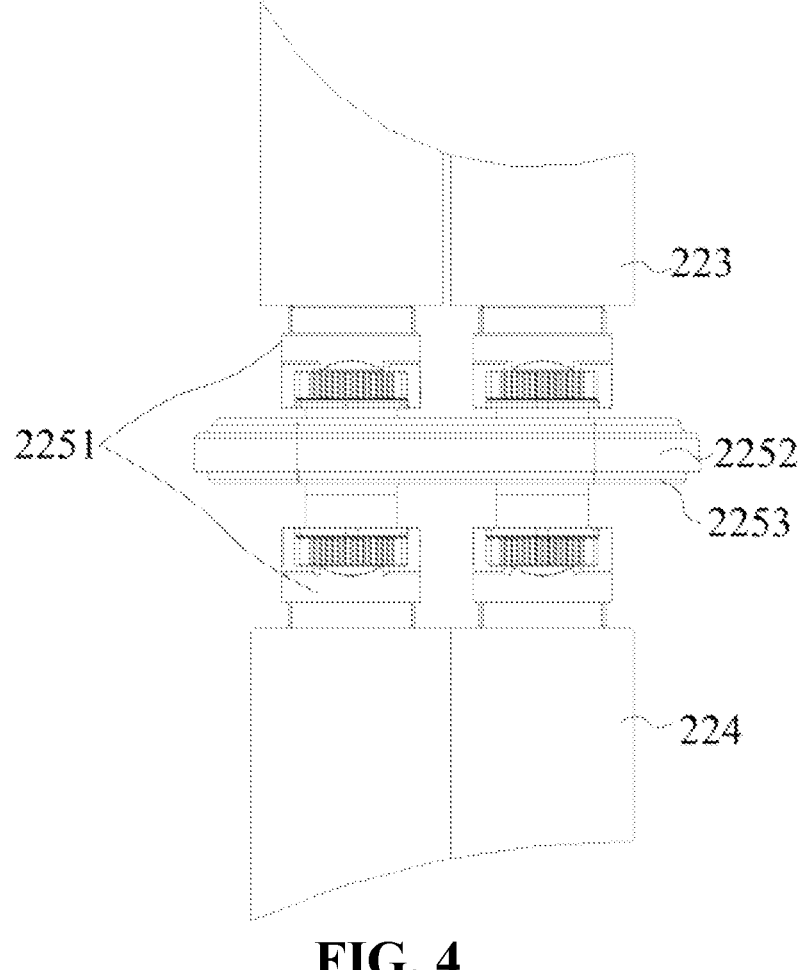
Figure 5:
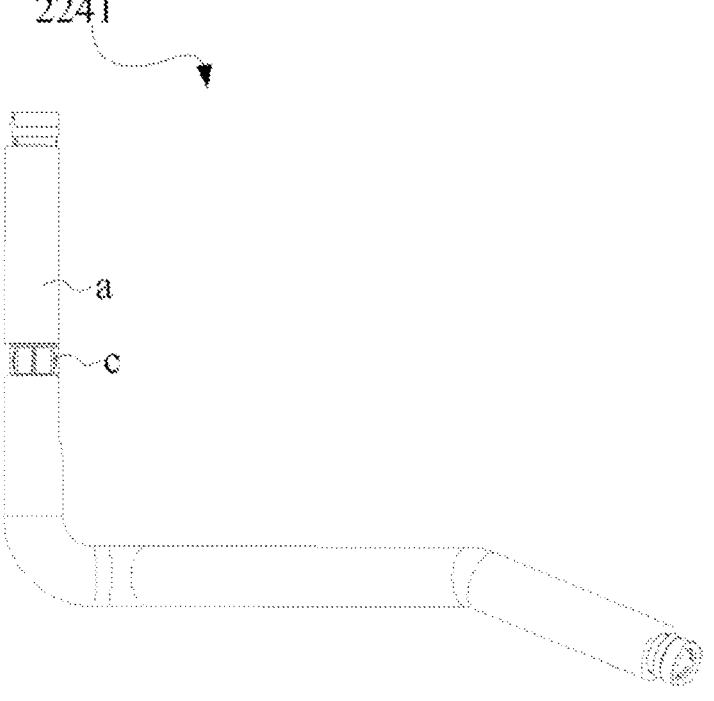
Figure 6:
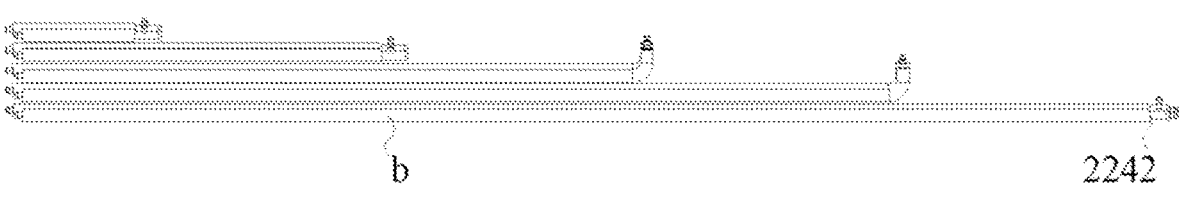
Figure 7:
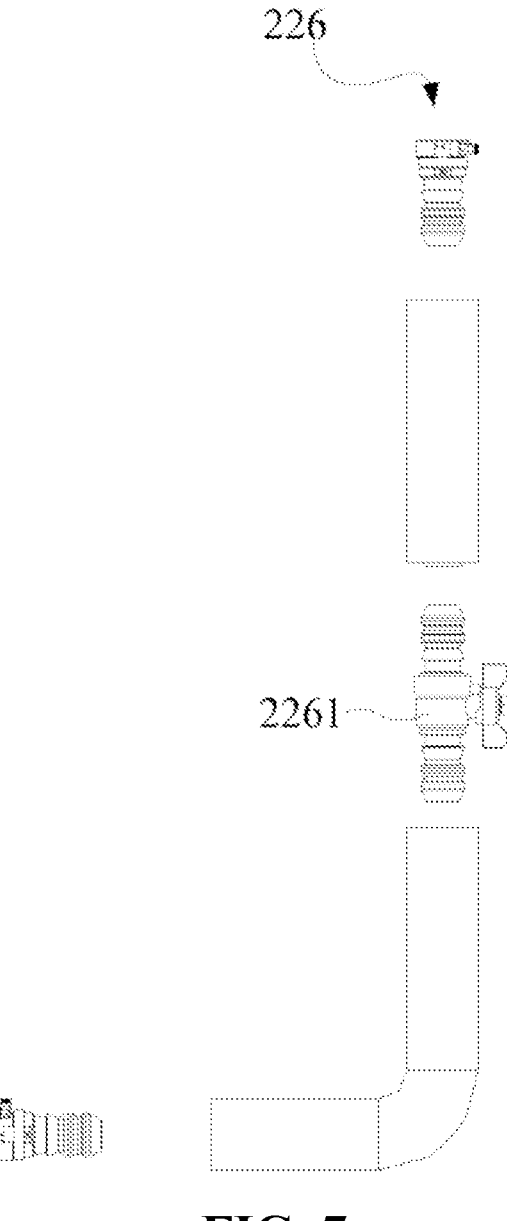
Figure 8:
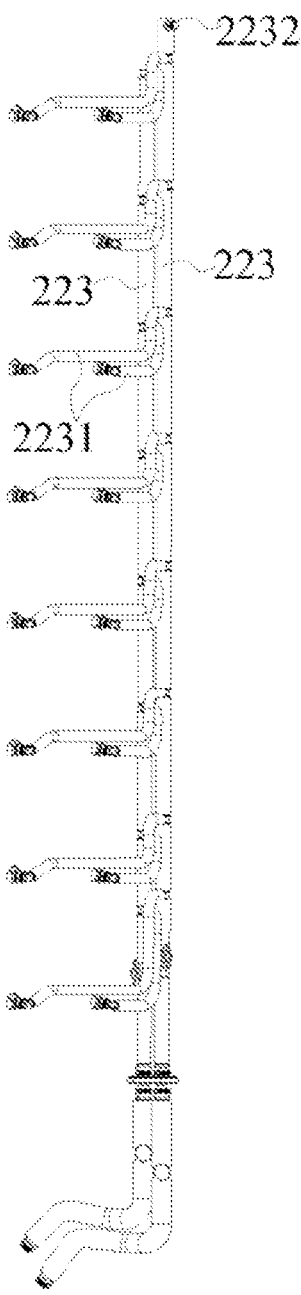

4 preferred embodiments only and are not to be considered as limiting the present application. Also, the same components are denoted by the same reference numerals throughout the drawings. In the drawings:

FIG. 1 shows a schematic structural diagram of an energy storage device in an embodiment of the present application;

FIG. 2 shows a schematic pipeline diagram of a thermal management system in an embodiment of the present application;

FIG. 3 shows a schematic structural diagram of a thermal management system in an embodiment of the present application;

FIG. 4 shows a schematic structural diagram of a flange assembly in an embodiment of the present application;

FIG. 5 shows a schematic structural diagram of an L-shaped pipe in an embodiment of the present application;

FIG. 6 shows a schematic structural diagram of a long pipe in an embodiment of the present application;

FIG. 7 shows a schematic structural diagram of a nylon pipeline in an embodiment of the present application; and FIG. 8 shows a schematic structural diagram of a first pipeline in an embodiment of the present application.

10. Energy storage device; 110. Battery cabinet; 120. Water chilling plate; 130. Electric cabin; 210. Water chilling unit; 220. Battery cabinet pipeline; 221. Battery cabinet inlet pipe; 222. Battery cabinet outlet pipe; 223. First pipeline; 2231. Branch pipe; 2232. Exhaust valve; 224. Second pipeline; 2241. L-shaped pipe; 2242. Long pipe; a. First section; b. Second section; c. Stop valve; 225. Flange assembly; 2251. Pipe joint; 2252. Flange; 2253. Seal ring; 226. Nylon pipeline; 2261. On-off valve; 230. Heat dissipator assembly; 231. Heat exchanger; 232. Cooling fan; 240. Second pipeline assembly; 241. Electric cabin inlet pipe; 242. Electric cabin outlet pipe; and 250. Water pump.

DETAILED DESCRIPTION

Embodiments of the technical solution of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "a plurality of sets" refers to two or more (including two) sets, and "a plurality of sheets" refers to two or more (including two) sheets.

In the description of the embodiments of the present application, the orientation or position relationship indicated by the technical terms "center", "longitudinal", "transverse", "length", "width", "thickness", "upper," "lower," "front," "back," "left," "right," "vertical," "horizontal," "top," "bottom," "inner," "outer," "clockwise," "counterclockwise," "axial", "radial", "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

In order to facilitate the movement and transportation of energy storage devices, an energy storage device type energy storage device has appeared in the related art. A plurality of battery cabinets are arranged in a box body of the energy storage device, and a battery pack for storing energy is arranged in each battery cabinet. The battery packs will generate a lot of heat during charging and discharging. In order to cool down these battery packs, the existing energy storage device type energy storage device is equipped with a corresponding heat dissipation device.

The existing heat dissipation device includes a main pipeline and a plurality of branch pipelines connected to the main pipeline. The plurality of branch pipelines cool the battery packs in the plurality of battery cabinets in a one-to-one corresponding mode. In order to optimize the pipeline layout, it is usually necessary to arrange an even number of branch pipelines to maintain the balance of flow division of the main pipeline, which greatly limits the application of the heat dissipation device. In addition, parallel-connection nodes of the plurality of branch pipelines are arranged in the middle of the main pipeline, resulting in low flexibility of flow division points of the main pipeline, and also limiting the application of the heat dissipation device.

In order to solve the problem of great application limitations of the existing heat dissipation device, the applicant found through research that it is necessary to design a thermal management system that connects a plurality of first pipeline assemblies in parallel to a water chilling unit, and each first pipeline assembly is an independent pipeline, which can deliver cooling liquid to the corresponding battery cabinets. The plurality of first pipeline assemblies are independent of each other, the pipeline assemblies used to cool the battery cabinets can be individually controlled, the design of the main pipeline is abandoned, the number of the first pipeline assemblies is not limited, and the parallel-connection nodes of the plurality of first pipeline assemblies are no longer limited to the main pipeline.

The thermal management system disclosed by embodiments of the present application can be used, but not limited to, in the energy storage device. The thermal management system disclosed by the present application can be used to perform thermal management on a power supply system in the energy storage device, which is conducive to maintaining long-term and stable use of the power supply system, thereby prolonging the service life and improving the safety of the power supply system.

FIG. 1 shows a schematic structural diagram of an energy storage device 10 in an embodiment of the present application.

Referring to FIG. 1, the energy storage device 10 provided by an embodiment of the present application includes a plurality of battery cabinets 110 and a thermal management system. A battery pack is arranged in the battery cabinet 110, and the thermal management system is used for performing thermal management on the battery packs in the battery cabinets 110.

FIG. 2 shows a schematic pipeline diagram of a thermal management system in an embodiment of the present application.

According to some embodiments of the present application, referring to FIG. 2, the thermal management system for the energy storage device 10 provided by an embodiment of the present application includes a water chilling unit 210 and a plurality of sets of first pipeline assemblies. The plurality of sets of first pipeline assemblies correspond to the plurality of battery cabinets 110 one to one, and are connected to the water chilling unit 210 in parallel.

The number of the first pipeline assemblies corresponds to the number of the battery cabinets 110, and fluid in the first pipeline assemblies is supplied to water chilling plates 120 of the battery packs in the corresponding battery cabinets 110, so as to perform thermal management on the battery packs in the battery cabinets 110.

Each of the first pipeline assemblies includes two battery cabinet pipelines 220, one end of the two battery cabinet pipelines 220 is connected to a water inlet side and a water outlet side of the water chilling unit 210 respectively, and the other ends of the two battery cabinet pipelines 220 penetrate into the corresponding battery cabinets 110 respectively and are connected to water chilling plates 120 of the battery packs in the battery cabinets 110.

For convenience of description, two of the battery cabinet pipelines 220 are a battery cabinet inlet pipe 221 connected to the water outlet side of the water chilling unit 210 and a battery cabinet outlet pipe 222 connected to the water inlet side of the water chilling unit 210. Then, the ends of the battery cabinet inlet pipe 221 and the battery cabinet outlet pipe 222 away from the water chilling unit 210 are both connected to the water chilling plate 120 of the battery pack in the corresponding same battery cabinet 110.

The temperature of the fluid flowing out of the water outlet side of the water chilling unit 210 may be adjusted according to the temperature required by the battery packs. A first temperature sensor may be arranged at the battery pack. The first temperature sensors and the water chilling unit 210 are both electrically connected to a controller. The controller makes the water chilling unit 210 flow out fluid at an appropriate temperature according to the temperature acquired by the first temperature sensors.

The fluid may be a heat exchange medium such as water.

It can be understood that, water flowing out from the water outlet side of the water chilling unit 210 can flow into the battery cabinet inlet pipe 221 of the plurality of sets of first pipeline assemblies respectively and then flow into the water chilling plates 120 of the battery packs in the corresponding battery cabinets 110, the water flowing into the water chilling plates 120 of the battery packs can exchange heat with air in the battery packs, the water after heat exchange then flows into the corresponding battery cabinet outlet pipe 222, and the water in the battery cabinet outlet pipe 222 of the plurality of sets of first pipeline assemblies can flow back into the water inlet side of the water chilling unit 210. In this way, the water chilling unit 210 can be used to perform thermal management on the battery packs in the plurality of battery cabinets 110, and the plurality of sets of first pipeline assemblies are independent of each other, so that each first pipeline assembly can be independently controlled. Obviously, the thermal management system abandons the design of a main pipeline, the number of the first pipeline assemblies is not limited, and parallel-connection nodes of the plurality of sets of first pipeline assemblies are no longer limited to the main pipeline, which can broaden the application range of the thermal management system.

It should be noted that: the water flowing into the water chilling plates 120 of the battery packs can exchange heat with the air in the battery packs, including two cases, the first case being: the water flowing into the water chilling plates 120 of the battery packs can take away heat of the battery packs when the temperature of the battery packs is high. The second case is: the water flowing into the water chilling plates 120 of the battery packs can provide heat to the battery packs when the temperature of the battery packs is low.

According to some embodiments of the present application, the ends of the battery cabinet pipelines 220 away from the water chilling unit 210 are configured to penetrate from bottom ends of the corresponding battery cabinets 110 to be connected with the water chilling plates 120 of the battery packs in the battery cabinets 110.

That is to say, the ends of the battery cabinet inlet pipe 221 and the battery cabinet outlet pipe 222 away from the water chilling unit 210 penetrate into the bottom end of the corresponding battery cabinet 110 respectively, and are connected to the water chilling plate 120 of the battery pack in the battery cabinet 110.

The ends of the battery cabinet inlet pipe 221 and the battery cabinet outlet pipe 222 away from the water chilling unit 210 both penetrate into the corresponding battery cabinet 110 from the bottom end of the corresponding battery cabinet 110, so that the situation that liquid leaked in the pipelines flows to the battery pack in the battery cabinet 110 due to the pipelines penetrating into the battery cabinet 110 from the top end of the battery cabinet 110 is avoided, and potential safety hazards can be reduced.

According to some embodiments of the present application, referring to FIG. 2, and in combination with FIG. 3 and FIG. 4, the battery cabinet pipeline 220 includes a first pipeline 223 connected to the water chilling plate 120, a second pipeline 224 connected to the water chilling unit 210, and a pipe joint 2251 connecting the first pipeline 223 and the second pipeline 224 and penetrating through the bottom end of the corresponding battery cabinet 110 and the pipe joint 2251 is sleeved with a flange 2252 tightly connected to the bottom end of the corresponding battery cabinet 110.

It can be understood that the first pipeline 223 is located inside the corresponding battery cabinet 110, and the second pipeline 224 is located outside the corresponding battery cabinet 110. The pipe joint 2251 penetrates through the corresponding battery cabinet 110, so the battery cabinet 110 is provided with an opening for the pipe joint 2251 to penetrate through.

The flange 2252 tightly connected to the bottom end of the corresponding battery cabinet 110 can improve the airtightness of the battery cabinet 110 without affecting the penetration of the pipe joint 2251 through the bottom end of the corresponding battery cabinet 110.

In some embodiments, referring to FIG. 2, two of the battery cabinet pipelines 220 share one flange 2252, that is, the battery cabinet inlet pipe 221 and battery cabinet outlet pipe 222 share one flange 2252.

In some embodiments, referring to FIG. 4, the pipe joints 2251 of two of the battery cabinet pipelines 220 penetrate through the flange 2252, the pipe joints 2251 and the flange 2252 are integrally formed, and the pipe joints 2251 and the flange 2252 are combined to form a flange assembly 225, which is more convenient to use.

According to some embodiments of the present application, referring to FIG. 2, a seal ring 2253 tightly connected to a bottom inner wall of the corresponding battery cabinet 110 is arranged on one side of the flange 2252 facing the bottom end of the corresponding battery cabinet 110, to make the flange 2252 tightly connected to the bottom end of the corresponding battery cabinet 110.

It can be understood that the flanges 2252 are located on the battery cabinets 110.

The flanges 2252 can be pressed and fixed on the bottom inner walls of the corresponding battery cabinets 110, not only can the flanges 2252 stably mounted, but also the seal rings 2253 can be tightly attached on the bottom inner walls of the corresponding battery cabinets 110, so that the airtightness of the battery cabinets 110 is improved, and it is ensured that the environment in the battery cabinets 110 is not affected by the humidity and temperature of the external atmospheric environment.

That is to say, the battery cabinet pipelines 220 may penetrate through the openings on the corresponding battery cabinets 110, and at the same time, the seal rings 2253 on the flanges 2252 may also be used to improve the airtightness of the battery cabinets 110, so that the airtightness of the battery cabinets 110 will not be affected due to the arrangement of the openings.

According to some embodiments of the present application, referring to FIG. 2 and in combination with FIG. 5 and FIG. 6, the second pipeline 224 further includes a first section a connected to the pipe joint 2251 and perpendicular to a bottom surface of the battery cabinet 110 and a second section b connected to the water chilling unit 210 and parallel to the bottom surface of the battery cabinet 110.

It can be seen that the second pipeline 224 is of an L-shaped structure.

It is not only convenient for the first sections a to be connected to the pipe joints 2251 penetrating through the bottom ends of the corresponding battery cabinets 110, but also allows the second sections b to be distributed in a direction parallel to the bottom surfaces of the battery cabinets 110, which is beneficial to saving the occupied space of the first pipeline assemblies.

In some embodiments, referring to FIG. 3 and FIG. 6, the second sections b are parallel to a width direction of bottom plates of the battery cabinets 110, the second sections b of the plurality of sets of first pipeline assemblies are distributed at intervals in a length direction of the bottom plates of the battery cabinets 110, and the layout is reasonable, which is more conducive for the occupying space of the first pipeline assemblies.

In some embodiments, referring to FIG. 5 and FIG. 6, the second pipeline 224 includes an L-shaped pipe 2241 connected to the pipe joint 2251 and a long pipe 2242 connected to the L-shaped pipe 2241, the first section a is formed at a section of the L-shaped pipe 2241 away from the long pipe 2242, and the second section b is formed at the long pipe 2242. The second sections b distributed in the direction parallel to the bottom surfaces of the battery cabinets 110 can be better connected to the pipe joints 2251 by means of the L-shaped pipes 2241.

In some embodiments, the L-shaped pipes 2241 may be nylon pipes, and the nylon pipes are provided with insulation layers, which can improve the insulation effect and the thermal insulation effect of the L-shaped pipes 2241.

The long pipes 2242 may be aluminum pipes, which have lighter weights and better strength.

According to some embodiments of the present application, referring to FIG. 5, and in combination with FIG. 7, a drain port is formed in the first section a, and a normally closed stop valve c is arranged on the drain port. An on-off valve 2261 is arranged between the second section b and the water chilling unit 210.

The stop valves c are in a normally closed state, and the first sections a will not leak due to the drain ports. The first pipeline assemblies that ensure normal operation are closed systems, which are conducive to maintaining the cleanliness, stability and long-term effect of the fluid inside the first pipeline assemblies, can solve the problem of frequent replacement and addition of antifreeze in engineering, and reduce the system operation and maintenance cost.

When needed, the on-off valves 2261 can be closed and the stop valves c can be opened to empty fluid in the battery cabinet pipelines 220, which is convenient for checking and repairing the battery cabinet pipelines 220.

It should be noted that, because the plurality of sets of first pipeline assemblies are independent of each other, when the battery cabinet pipeline 220 of a certain first pipeline assembly needs to be checked and repaired, corresponding checking and repairing can be carried out independently without affecting the use of other first pipeline assemblies, and it can be seen that the design of the thermal management system can improve the convenience of repairing.

In some embodiments, referring to FIG. 2 and in combination with FIG. 8, the end of the first pipeline 223 away from the pipe joint 2251 is provided with an exhaust valve 2232. After checking and repairing of the battery cabinet pipelines 220 are completed, a liquid injection tool may be adopted to inject the same fluid as the fluid flowing out of the water chilling unit 210 into the drain ports, and the exhaust valves 2232 are opened to facilitate the emptying of the air in the battery cabinet pipelines 220.

It should be noted that FIG. 8 shows a schematic structural diagram of the first pipelines 223 of two of the battery cabinet pipelines 220.

In some embodiments, the on-off valves 2261 may be ball valves, which are convenient for controlling the on-off of the fluid supplied by the water chilling unit 210 to the water chilling plates of the battery packs in the corresponding battery cabinets 110, and can realize adding antifreeze to the sets of first pipeline assemblies respectively, which is conductive to reducing the difficulty and cost of operation and maintenance.

In some embodiments, referring to FIG. 2 and FIG. 7, a nylon pipeline 226 is arranged between the second section b and the water chilling unit 210, and the ball valve is arranged on the nylon pipeline 226 to facilitate the on-off control of the battery cabinet pipeline 220.

According to some embodiments of the present application, referring to FIG. 2 and FIG. 8, a plurality of battery packs are arranged in the battery cabinets 110, and the first pipeline 223 is provided with a plurality of branch pipes 2231 correspondingly connected to the water chilling plates 120 of the plurality of battery packs one to one.

It can be understood that each set of first pipeline assemblies and the water chilling unit 210 form a battery cabinet circulation loop, and fluid in one battery cabinet circulation loop can be supplied to the water chilling plates 120 of the plurality of battery packs in the corresponding battery cabinets 110 to perform thermal management on the plurality of battery packs.

According to some embodiments of the present application, the battery cabinet pipeline 220 is provided an insulation layer, so that the heat insulation effect of the battery cabinet pipeline 220 can be improved, and the phenomenon of condensation on the battery cabinet pipeline 220 is avoided.

Both the L-shaped pipes 2241 and the first pipelines 223 may be nylon pipes, and the nylon pipes are provided with insulation layers. Specifically, the nylon pipes are formed of multi-layer high molecular materials, and the nylon pipes are further provided with insulating cotton layers, which can effectively avoid the phenomenon of condensation on the nylon pipes.

According to some embodiments of the present application, referring to FIG. 3, the plurality of battery cabinets 110 are divided into two battery cabinet sets arranged at intervals in a first direction, and each battery cabinet set includes a plurality of battery cabinets 110 arranged at intervals in a second direction. The plurality of sets of first pipeline assemblies are distributed at intervals in the first direction, wherein the first direction and the second direction are perpendicular to each other.

The first direction is approximately parallel to the length direction of the bottom plates of the battery cabinets 110 and is approximately parallel to the width direction of the bottom plates of the battery cabinets 110. Then, the plurality of sets of first pipeline assemblies are distributed at intervals in the length direction of the bottom plates of the battery cabinets 110.

The pipeline layout of the thermal management system can be made more reasonable, which is more conducive to reducing the occupied space of the first pipeline assemblies.

According to some embodiments of the present application, referring to FIG. 2, the energy storage device 10 further includes an electric cabin 130, and the thermal management system further includes a heat exchanger 231 arranged in the electric cabin 130, and a second pipeline assembly 240 connected to the heat exchanger 231 and the water chilling unit 210 respectively.

The second pipeline assembly 240 includes an electric cabin inlet pipe 241 and an electric cabin outlet pipe 242 connected to the water inlet side and the water outlet side of the water chilling unit 210 respectively. One ends of the electric cabin inlet pipe 241 and the electric cabin outlet pipe 242 away from the water chilling unit 210 are connected to two ends of a heat exchange pipe of the heat exchanger 231 respectively.

As such, the water chilling unit 210 is connected to the heat exchange pipe of the heat exchanger 231 to form an electric cabin circulation pipeline. Fluid in the electric cabin circulation pipeline can exchange heat with air in the environment where the heat exchanger 231 is located, that is, the fluid in the electric cabin circulation pipeline can exchange heat with the air in the electric cabin 130 to adjust the temperature in the electric cabin 130 to an appropriate temperature.

In some embodiments, referring to FIG. 2, a water pump 250 is arranged between the heat exchanger 231 and the second pipeline assembly 240, the water pump 250 may be locked in the electric cabin 130 through bolts, and the fluid (such as cooling liquid) in the water chilling unit 210 may be delivered by pressure into the heat exchange pipe of the heat exchanger 231 by means of the water pump 250, so that the fluid in the electric cabin circulation pipeline can exchange heat with the air in the electric cabin 130.

In some embodiments, the second pipeline assembly 240 may be fixed in the electric cabin 130 by a cable tie assembly, so as to improve the stability of the second pipeline assembly 240.

In some embodiments, the temperature in the electric cabin 130 may be adjusted according to the temperature required by a distribution box in the electric cabin 130. Specifically, a second temperature sensor electrically connected to a controller may be arranged in the distribution box, and the controller makes the water chilling unit 210 flow out fluid at a suitable temperature according to the temperature obtained by the second temperature sensor, so that the temperature in the electric cabin 130 can be adjusted to a suitable temperature.

According to some embodiments of the present application, the distribution box is arranged in the electric cabin 130. The thermal management system includes two heat exchangers 231 arranged on an air inlet and an air outlet of the distribution box respectively, and cooling fans 232 facing the adjacent heat exchangers 231 are arranged on the air inlet and the air outlet.

One of the heat exchangers 231 and the adjacent cooling fan 232 may be combined to form a heat dissipator assembly 230.

Two sets of heat dissipator assemblies 230 can be used to improve the circulation of air inside and outside the distribution box (the air outside the distribution box is the air in the electric cabin 130), improve the heat exchange effect, improve the energy efficiency of the water chilling unit 210 to a certain extent, and reduce the overall operating energy consumption of the battery packs and electric parts in the energy storage device 10.

According to some embodiments of the present application, referring to FIG. 2, each set of first pipeline assemblies and the water chilling unit 210 form a battery cabinet circulation loop, and fluid in one battery cabinet circulation loop can be supplied to the water chilling plates 120 of the plurality of battery packs in the corresponding battery cabinets 110 to perform thermal management on the plurality of battery packs. Each of the first pipeline assemblies includes the battery cabinet inlet pipe 221 connected to the water outlet side of the water chilling unit 210 and the battery cabinet outlet pipe 222 connected to the water inlet side of the water chilling unit 210. The battery cabinet inlet pipe 221 and the battery cabinet outlet pipe 222 include the first pipeline 223, the L-shaped pipe 2241, the long pipe 2242 and the nylon pipeline 226, wherein the first pipeline 223, the L-shaped pipe 2241 and the nylon pipeline 226 are all provided with heat insulation cotton layers, and the long pipes 2242 are aluminum pipes. The battery cabinet inlet pipe 221 and the battery cabinet outlet pipe 222 share one flange assembly 225. On the one hand, the ends of the battery cabinet inlet pipe 221 and the battery cabinet outlet pipe 222 away from the water chilling unit 210 both penetrate into the corresponding battery cabinet 110 from the bottom end of the corresponding battery cabinet 110, so that potential safety hazards can be reduced; and on the other hand, the flange assembly 225 can be used to improve the airtightness of the battery cabinet 110 to ensure that the environment in the battery cabinet 110 is not affected by the humidity and temperature of the external atmospheric environment.

In some embodiments, the long pipes 2242 are parallel to the width direction of the bottom plates of the battery cabinets 110, the long pipes 2242 of the plurality of sets of battery cabinet pipelines 220 are distributed at intervals in the length direction of the bottom plates of the battery cabinets 110, and the layout is reasonable, which is more conducive for the occupying space of the first pipeline assemblies.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present application specifically and in detail, but cannot be construed as a limitation to the patent scope of the present application. It should be pointed that for a person of ordinary skill in the art, several variants and improvements can be made without departing from the idea of the present application, which all belong to the protection scope of the present application. Therefore, the protection scope of the present application patent should be subject to the appended claims.

The invention claimed is:

1. An energy storage device comprising a thermal management system, the energy storage device comprising a plurality of battery cabinets, and battery packs being arranged in the battery cabinets, wherein the thermal management system comprises:

a water chilling unit; and a plurality of sets of first pipeline assemblies, corresponding to the plurality of battery cabinets one to one, and connected to the water chilling unit in parallel; and, wherein each of the first pipeline assemblies comprises two battery cabinet pipelines, one end of the two battery cabinet pipelines is connected to a water inlet side and a water outlet side of the water chilling unit respectively, and the other ends of the two battery cabinet pipelines penetrate into corresponding battery cabinets respectively and are connected to water chilling plates of the battery packs in the battery cabinets;

wherein the ends of the battery cabinet pipelines away from the water chilling unit are configured to penetrate from a bottom wall of the corresponding battery cabinets for connecting with the water chilling plates of the battery packs in the battery cabinets, wherein the battery cabinet pipelines comprise a first pipeline connected to the water chilling plate, a second pipeline connected to the water chilling unit, and a pipe joint connecting the first pipeline and the second pipeline and penetrating through the bottom wall of a corresponding battery cabinet, wherein the pipe joint is sleeved with a flange tightly connected to the inner side of the bottom wall of the corresponding battery cabinet, and a seal ring tightly connected to an inner side of the bottom wall of the corresponding battery cabinet is arranged on one side of the flange facing the bottom wall of the corresponding battery cabinet, to make the flange tightly connected to the inner side of the bottom wall of the corresponding battery cabinet.

2. The energy storage device according to claim 1, wherein the second pipeline further comprises a first section (a) connected to the pipe joint and perpendicular to a bottom surface of the battery cabinet and a second section (b) connected to the water chilling unit and parallel to the bottom surface of the battery cabinet.

3. The energy storage device according to claim 2, wherein a drain port is arranged on the first section (a), and a normally closed stop valve (c) is arranged on the drain port; and an on-off valve is arranged between the second section (b) and the water chilling unit.

4. The energy storage device according to claim 1, wherein a plurality of battery packs are arranged in the battery cabinet; and the first pipeline is provided with a plurality of branch pipes correspondingly connected to the water chilling plates of the plurality of battery packs one to one.

5. The energy storage device according to claim 1, wherein an insulation layer is arranged on the battery cabinet pipeline.

6. The energy storage device according to claim 1, wherein the plurality of battery cabinets are divided into two battery cabinet sets arranged at intervals in a first direction, and each battery cabinet set comprises a plurality of battery cabinets arranged at intervals in a second direction;

the plurality of sets of first pipeline assemblies are distributed at intervals in the first direction; and the first direction and the second direction are perpendicular to each other.

7. The energy storage device according to claim 1, wherein the energy storage device further comprises an electric cabin; and the thermal management system further comprises a heat exchanger arranged in the electric cabin, and a second pipeline assembly connected to the heat exchanger and the water chilling unit respectively.

8. The energy storage device according to claim 7, wherein a distribution box is arranged in the electric cabin;

the thermal management system comprises two heat exchangers arranged on an air inlet and an air outlet of the distribution box respectively; and both the air inlet and the air outlet are provided with cooling fans facing adjacent heat exchangers.

\* \* \* \* \*